(12) United States Patent
Haguenauer et al.

(10) Patent No.: US 8,026,489 B2
(45) Date of Patent: Sep. 27, 2011

(54) DEVICE FOR CHARACTERIZING A PARTICLE BEAM

(75) Inventors: Maurice Haguenauer, Viroflay (FR); Alain Busata, Conlans-Sainte-Honorine (FR); Akli Karar, Clamart (FR)

(73) Assignee: Centre National de la Recherche Scientifique—CNRS, Paris (FR)

( * ) Notice: Subject to any disclaimer, the term of this patent is extended or adjusted under 35 U.S.C. 154(b) by 0 days.

(21) Appl. No.: 12/223,991

(22) PCT Filed: Feb. 13, 2007

(86) PCT No.: PCT/FR2007/050790
§ 371 (c)(1),
(2), (4) Date: Aug. 13, 2008

(87) PCT Pub. No.: WO2007/093735
PCT Pub. Date: Aug. 23, 2007

(65) Prior Publication Data
US 2010/0065747 A1 Mar. 18, 2010

(30) Foreign Application Priority Data
Feb. 13, 2006 (FR) ...................................... 06 50504

(51) Int. Cl.
*G01T 1/20* (2006.01)
(52) U.S. Cl. ....................................................... 250/368
(58) Field of Classification Search .................. 250/366, 250/368, 390.11, 397
See application file for complete search history.

(56) References Cited

U.S. PATENT DOCUMENTS

| 4,942,302 A | | 7/1990 | Koechner |
| 4,973,845 A | * | 11/1990 | Mastrippolito et al. ...... 250/368 |
| 5,155,366 A | * | 10/1992 | Miller .......................... 250/368 |

(Continued)

FOREIGN PATENT DOCUMENTS

| DE | 197 07 714 A1 | 8/1997 |
| DE | 101 35 092 A1 | 1/2003 |
| FR | 2 582 100 A1 | 11/1986 |
| FR | 2 849 697 A1 | 7/2004 |
| JP | 10 082862 A | 3/1998 |

OTHER PUBLICATIONS

Terasawa K. et al: "Scintillating fiber camera for neutron dosimetry in spacecraft", Nuclear Instruments & Methods in Physics Research, Section—A: Accelerators, Spectrometers, Detectors and Associated Equipment, Elsevier, Amsterdam, NL, vol. 457, No. 3, Jan. 21, 2001, pp. 499-508, XP004314560, ISSN: 0168-9002.

(Continued)

*Primary Examiner* — David Porta
*Assistant Examiner* — Marcus Taningco
(74) *Attorney, Agent, or Firm* — Harness, Dickey & Pierce, P.L.C.

(57) ABSTRACT

The invention concerns a device for analyzing a particle beam comprising at least one detector including a fiber-optic network, the network of parallel fibers comprising at least one first plane of parallel optical fibers oriented along a first direction X; the detector is designed to produce a light signal when the particle beam passes through the fiber-optic network, an image sensor coupled with the detector so as to output a signal representing characteristics of the light signal. The invention is characterized in that the image sensor comprises a CCD or CMOS sensor, wherein the ends of the fibers of the fiber-optic network are designed to form an image of the light signal in the plane of the CCD or CMOS sensor.

20 Claims, 1 Drawing Sheet

U.S. PATENT DOCUMENTS

| | | | |
|---|---|---|---|
| 5,289,510 A * | 2/1994 | Mihalczo | 376/258 |
| 5,506,408 A * | 4/1996 | Vickers et al. | 250/366 |
| 5,856,673 A | 1/1999 | Ikegami et al. | |
| 5,990,483 A * | 11/1999 | Shariv et al. | 250/397 |
| 2003/0178574 A1* | 9/2003 | Wallace et al. | 250/390.11 |
| 2004/0159792 A1 | 8/2004 | Andreaco et al. | |
| 2005/0236577 A1* | 10/2005 | Katagiri | 250/390.11 |
| 2006/0153341 A1 | 7/2006 | Guyonnet et al. | |

OTHER PUBLICATIONS

Mondardini Maria Rosa: "A New Detector for Low-PT Physics" Nuclear Physics B. Proceedings Supplement, North-Holland, Amsterdam, NL, vol. 25B, Mar. 1992, pp. 294-297, XP008069979, ISSN: 0920-5632.

* cited by examiner

DEVICE FOR CHARACTERIZING A PARTICLE BEAM

CROSS-REFERENCE TO RELATED APPLICATIONS

This application is a 371 U.S. National Stage of International Application No. PCT/FR2007/050790, filed Feb. 13, 2007. This application claims the benefit of French Patent Application No. FR 0650504, filed Feb. 13, 2006. The disclosures of the above applications are expressly incorporated herein by reference.

BACKGROUND AND SUMMARY

The present invention relates to the field of particle beam analysis equipment.

It is frequent to want to characterise a particle beam in various applications such as in the fields of fundamental physics, biophysics, machines for the producing synchrotron radiation, and more generally any charged particle beam.

Prior art already knows analysis equipment that makes it possible to detect and characterise a particle beam, such as wire chambers. Such devices require a gas supply involving a supply and regulation device but also a safety system and monitoring by a qualified operator. They are cumbersome, not flexible, difficult to use, to handle and to maintain.

U.S. Pat. No. 4,942,302 is also known describing a device comprising two detectors each coupled to a plane of scintillating fibres respectively extending in a horizontal direction for one and in a vertical direction for the other. Said detectors comprising scintillating optical fibres having a reading system based on photomultiplier tubes (PMT) which obtain a signal which is then amplified then converted into a digital signal.

The present invention more specifically relates to equipment for analysing a particle beam comprising:
at least one detector comprising a network of optical fibres (9), the network of fibres comprising at least one first plane of optical fibres oriented according to a first direction X;
the detector being arranged to produce a light signal when the particle beam passes through the network of optical fibres,
an image sensor coupled with the detector such as to output a signal representing features of the light signal.

Such equipment is known from the French patent application FR 2 849 697. In said patent application, the image sensor comprises a photomultiplier tube. It is well known that such a photomultiplier tube can produce a detector of a light beam only particle by particle. In the equipment described in the abovementioned French application, a dosage of the particle beam is thus produced counting one by one the particles of said beam. Due to said particle by particle counting, the Applicant has demonstrated that such equipment equipped with a photomultiplier tube can only detect less than one million ($10^6$) particles per second. To obtain a better detection rate, the current induced in the photomultiplier tube becomes too substantial and extremely complex electronics would be required at the outlet of the photomultiplier tube. For a detection rate greater than one million particles per second, such equipment comprising a photomultiplier tube is therefore very limited by the intensity of the particle beam. For many years, the person skilled in the art has attempted, from such equipment with a photomultiplier tube, to provide an electronics that can process such particle beam intensities.

Furthermore, the photomultiplier tubes have the disadvantage of not being able to be used in the vacuum, where preferably the beams circulate. Furthermore, only a dosage of the particle beam is directly possible with such equipment. In particular, it is not possible, with such equipment, to directly measure the average position and/or intensity and/or the spatial and temporal dispersion of a particle beam.

The invention notably aims to overcome said disadvantages. One aim of the invention is to provide equipment for analysing a particle beam such as above described, which can be effective in a wide range of particle beam intensities, for example between one thousand ($10^3$) and ten thousand billion ($10^{13}$) particles per second. The invention also aims to propose equipment having an easy implementation, suitable for an industrial type structure. The invention also aims to provide equipment which is highly stable over time, requiring no maintenance, and having no saturation phenomenon. The present invention also aims to provide analysis equipment which enables the average position and/or the intensity and/or the spatial and temporal dispersion of a particle beam to be measured.

At least one of said problems is solved by the invention, which relates, as abovementioned, to an equipment for analysing a particle beam comprising:
at least one detector comprising a network of optical fibres (9), the network of parallel fibres comprising at least one first plane of optical fibres oriented according to a first direction X
the detector being arranged to produce a light signal when the particle beam passes through the network of optical fibres,
an image sensor coupled with the detector such as to output a signal representing features of the light signal,
wherein the image sensor comprises a CCD or CMOS sensor, and wherein the ends of the optical fibres of the network of fibres are arranged to form an image of the light signal in the object plane of the CCD or CMOS sensor.

With the aid of the CCD or CMOS sensor, the Applicant has notably demonstrated that much higher particle beam intensities could be analysed satisfactorily. Thus, instead of looking to develop electronics adapted to high intensities, the Applicant has modified the most widespread image sensor of the prior art. Surprisingly, she has demonstrated that the use of CCD or CMOS sensors enabled the abovementioned disadvantages to be overcome.

Furthermore, the CCD or CMOS sensors have the advantage of being useable in cameras comprising processing means suitable for processing the information acquired by the CCD or CMOS sensor for a high particle intensity. The CCD or CMOS sensors also have the advantage of being useable in the vacuum. With the aid of the levels of particle beam intensities obtained according to the invention, the Applicant has demonstrated that it was possible to use the invention for hadrontherapy.

According to the invention, the preferred sensor is a CCD sensor because it enables particle beams to be measured for very high intensities. The CMOS sensor also enables the problems linked to the intensity to be solved, but in an intensity range slightly lower than that of the CCD sensor. According to one embodiment of the invention, the network of fibres can comprise a first plane of parallel optical fibres oriented according to a first direction X and a second plane of parallel optical fibres oriented according to a second direction Y, the ends of the optical fibres of each plane being arranged to form the image of the light signal in the object plane of the CCD or CMOS sensor.

According to one embodiment of the invention, the ends of the optical fibres of the network of optical fibres are brought together at the outlet of the detector to form the image of the light signal in the object plane of the CCD or CMOS sensor. This has the advantage of limiting the size of an objective which can be placed between the ends of the fibres and the object plane of the CCD or CMOS sensor. According to one embodiment, the beam of fibres of the first plane is substantially co-planar with the beam of fibres of the second plane, the end of said two beams of fibres forming two contiguous images. The CCD or CMOS sensor is chosen to be able to receive said two contiguous images, which can be juxtaposed or straddled on the sensor.

According to one embodiment, the ends of the beams of fibres of the first and second plane are brought together in the same object image plane. According to one particular implementation, the equipment comprises an ultra-high vacuum flange, and the object image plane is formed behind the ultra-high vacuum flange. Advantageously, said CCD is directly mounted in the object image plane.

According to one variant, said CCD sensor is built into a CCD camera. According to one mode of implementation, the detector comprises two stages linked by an ultra-high vacuum flange. According to one embodiment, the ultra-high vacuum flange is equipped with a port for passage of the light emitted by the fibres.

According to one embodiment, the first stage comprises two identical armatures wherein the optical fibres are urged to be placed. Advantageously, each of the armatures of the first stage respectively corresponds to the horizontal and vertical coordinates of the particle beam by fixing at 90° the angle between the two planes of fibres. According to one variant, the first stage is located in the vacuum tube of the beam. According to another variant, the second stage comprises an optical system associated to a CCD digital camera.

Advantageously, the scintillating optical fibres are aluminised over their entire length. According to one implementation, the optical fibres are manufactured in polystyrene. According to another embodiment, the second stage benefits from an electromagnetic shielding. According to one variant, the images are transferred on a PC type computer. Advantageously, the CCD sensor is formed by CCD arrays with an associated digital electronics. The invention also concerns the use of the abovementioned analysis equipment for hadron-therapy.

BRIEF DESCRIPTION OF THE DRAWING

The invention is best understood from the following description, provided merely for the purpose of explanation, of one embodiment of the invention, in reference to the appended FIGURE.

DETAILED DESCRIPTION

Figure 1:
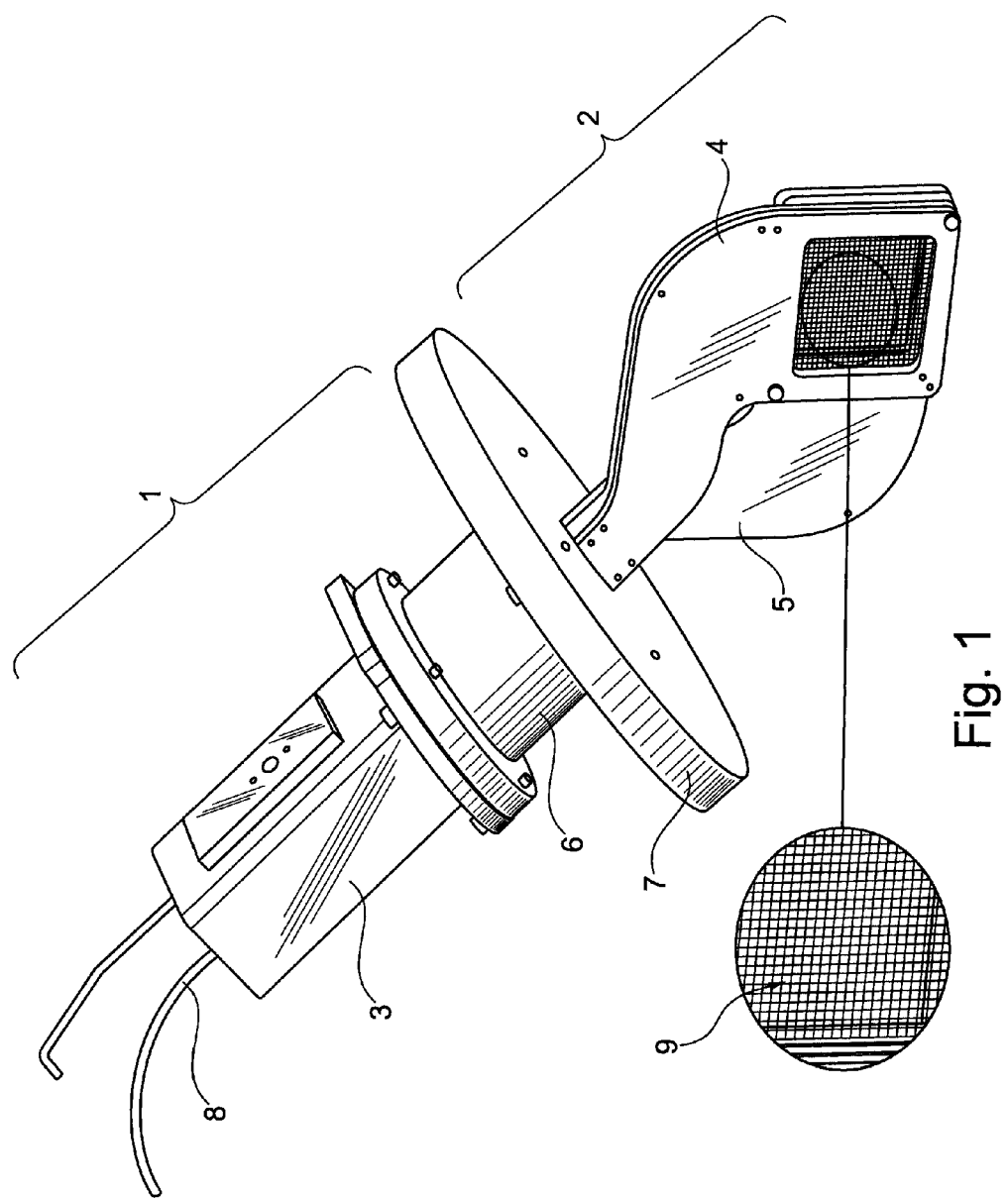
FIG. 1 illustrates an overall view of the detector.

According to the invention, illustrated in FIG. 1, the detector comprises two stages (1) (2) connected by an ultra-high vacuum flange (7). The first stage (2) is included in the vacuum tube of the beam.

It comprises two identical armatures (4) (5) made of stainless steel, one for the horizontal coordinates and the other for the vertical coordinates. In other words one armature (4) supports the fibres of a plane X and another armature (5) supports the fibres of a plane Y. In each of the planes of said armatures (4) (5), the scintillating optical fibres (9) are placed in a parallel manner running through each of the armatures (4) (5) from one end to the other. The end on the beam side of each of said armatures (4) (5) is provided with an aperture describing a quadrilateral. Said two armatures (4) (5) are assembled such as to form a support of fibres which defines a matrix of columns and rows of fibres at the level of the aperture of said end. The other end of said support of fibres ends in the object image plane. At the level of said other end, the various terminations of said fibres (9) transmit to the optical system (6) the light created by the particle beam which runs through same.

The ultra-high vacuum flange (7) comprises a port enabling transmission of the light to the optical system (6) and is intended for being mounted on an equivalent flange of the vacuum tube of the beam. The ultra-high vacuum flange (7) isolates the vacuum by approximately $10^{-8}$ mbar/cm$^2$ wherein the fibres are placed, the CCD system located outside of the vacuum tube (7) at atmospheric pressure.

The second stage (1) of said sensor is located outside of the vacuum tube of the beam and corresponds to the system for recording the quantity of light. It can be provided with an electromagnetic shielding enabling its use in or with equipment generating electromagnetic fields. As we have previously seen, said second stage (1) comprises an optical system (7) which focuses the light emanating from the scintillating optical fibres (9) in the image plane of the CCD sensor of the digital camera (3).

Said CCD digital camera (3) is connected to a PC type computer via a FIREWIRE cable (8) at the standard IEEE 1394 identical to the "general public" mode; the images obtained are processed and then stored. The scintillating optical fibres (9) used are made of polystyrene and have been subjected to a specific treatment. They have effectively been aluminised over the entire length thereof via spraying. One of the ends of each of the scintillating optical fibres has been subjected to high quality aluminisation for a light gain of approximately 60% in order to reflect the light produced towards the other end of the fibre in direction of the object image plane. The Kuraray brand scintillating optical fibres used in said application are square fibres.

In one embodiment, the equipment for analysing a particle beam comprises a detector consisting of two planes of 32 scintillating optical fibres each. Each scintillating optical fibre made of polystyrene has a square cross-section of $0.5 \times 0.5$ mm$^2$. The vertical scintillating optical fibres provide a horizontal cross-section of the shape of the particle beam; thus they provide the horizontal features of the beam and vice-versa.

In said embodiment the pitch of the scintillating optical fibres (9) is 2 mm, thus conferring a detection surface area of $62.5 \times 62.5$ mm$^2$. The scintillating optical fibres are then grouped in a 512×512 pixel matrix on the CCD inside the camera (3). The reading is carried out by grouping of 8×8 pixels that we will subsequently call cells. The complete image of the 64 scintillating optical fibres covers 64×64 cells at one time for the horizontal and vertical planes.

The image of each $0.5 \times 0.5$ mm$^2$ scintillating optical fibre covers 4×4 cells. The digital content of the 16 cells is added up for each scintillating optical fibre after subtracting the background noise. The result is proportional to the number of particles which have passed through the detector. The 32+32 sums thus obtained for each fibre position will form the beam profile in each plane.

In said variant of the detector, the optical system (6) comprises a C-mount, 25 mm focus, and 1.3 to 1.4 aperture optical lens. It focuses an image (i.e. a quantity of light) which will be deposited on the CCD sensor of the digital camera (3). Said step for recording the quantity of light requires a CCD digital camera (3) meeting certain criteria such as the sensitivity, a low level of residual noise and the facility for recording data.

The camera (3) chosen in our embodiment is the Hamamatsu brand model 8084-03G. The choice of said brand and said model is not limiting. The technical features of said CCD digital camera (3) are the following:

Peltier cooling, an effective number of pixels of 1344×1024, a 40 M Hz/pixel clock, number of images per second: nominal 12.2 images/s and 58 images/s grouping the pixels into 8×8, a dynamic range of 12 bits ($2^{12}$=4096) of the analogue/digital converter (ADC), and an variable exposure time of 10 μs to 10 s.

An analogue/digital converter (ADC) of 12 bits ($2^{12}$=4096) enables the light induced in each scintillating optical fibre to be measured (9). Knowing the geometrical position of each scintillating optical fibre, and the representation of the content of the scintillating optical fibre according to the position thereof, the distribution in intensity of the beam is obtained. The measurement up to 3 standard deviations involves from the outset a dynamic range of 100 (3 standard deviations at 99% of the particle beam). On the other hand the width of the distribution can vary by factor 10 (between 1 and 10 mm).

The camera (3) used permits an exposure time ranging from 10 μs up to 10 s. It also has two levels of gain separated by 14 dB. The assembly provides a total dynamic range greater than $10^9$.

The invention then envisages the processing of the images obtained, by a computer program to be able determine the position, the size and the intensity of the beam. Apart from the ejections of particles, approximately one hundred images are recorded. They will provide a design base of an image known as a pedestal image. Said pedestal image will then be subtracted cell by cell from the image of the beam. The digital content of the matrix after subtraction of the pedestal is then corrected by a calibration factor. Said calibration factor is obtained outside of the beam and essentially corresponds to the geometrical acceptance of the scintillating optical fibre via the objective of the camera. It is obtained by measuring the signal deposited in each scintillating optical fibre by a $Sr^{90}$ source for a fixed exposure time. The result obtained will be the content of two dimension vectors of the number of scintillating optical fibres by plane X and Y. The beam profiles can be shown in cascade form, and will describe the position and the shape of the beam by measurement plane according to time.

The analysis equipment can establish the position of the particle beam with an accuracy that can reach two tenths of microns, the size of the beam from 1 mm up to 30 mm, and the intensity thereof from $10^3$ up to $10^{12}$ particles per second. The flexibility is obtained by the mechanical layout of the scintillating optical fibres and by the variable dynamic range of the CCD digital camera.

In another embodiment, the detector of the equipment comprises two planes 128 of scintillating optical fibres, of square cross-section (0.5×0.5 mm$^2$) placed side by side. The detection surface area is therefore 64×64 mm$^2$. The scintillating optical fibres are then grouped by twos (1×0.5 mm$^2$) the image of which will be formed on the CCD of the camera (3). The image of a scintillating optical fibre would therefore cover 8×4 cells. The overall image will cover 1344×512 pixels. Each of the two groups of 64 scintillating optical fibres will provide the image of the beam respectively in the horizontal and vertical planes. Said embodiment can be used to equip a device such as accelerators for hadrontherapy.

The digitised image coming from the CCD sensor is read by a computer in the same way as with a photographic apparatus or general public camera and enables images to be processed and stored. The processing of the image will provide the features of the beam measured, i.e. the average position thereof, the size thereof and the intensity thereof. Said features can be compared to a register in order to decide on the stopping of the beam or the adjustment to be performed for the next passages of the beam. Consequently, the present invention can be used within the context of hadrontherapy, for the accuracy, the flexibility and the low cost that said type of equipment confers.

The invention is described in the abovementioned paragraphs by way of example. It is understood that the person skilled in the art is able to produce variants of the invention without deviating from the scope of the patent.

The invention claimed is:

1. Equipment for analysing a particle beam comprising:
    at least one detector comprising a network of optical fibres, the network of parallel fibres comprising at least one first plane of optical fibres oriented according to a first direction X;
    the detector being arranged to produce a light signal when the particle beam passes through the network of optical fibres; and
    an image sensor coupled with the detector such as to output a signal representing features of the light signal, the image sensor comprising at least one of a CCD and CMOS sensor;
    wherein ends of the optical fibres of the network of fibres are arranged to form an object plane of the sensor, and
    wherein the image sensor has an exposure time ranging from 10 μs to 10 s, and a gain level total dynamic range greater than $10^9$.

2. The analysis equipment according to claim 1, wherein the network of fibres comprises a first plane of parallel optical fibres oriented according to a first direction X and a second plane of parallel optical fibres oriented according to a second direction Y, the ends of the optical fibres of each plane being arranged to form the image of the light signal in the object plane of the sensor.

3. The equipment for analysing a particle beam according to claim 2, wherein a beam of optical fibres of the first plane is substantially co-planar with a beam of optical fibres of the second plane, the ends of said two beams of fibres forming two contiguous images.

4. The equipment for analysing a particle beam according to claim 2, wherein ends of beams of optical fibres of the first and second plane are brought together in the same object image plane.

5. The analysis equipment according to claim 1, wherein the ends of the optical fibres of the network of optical fibres are brought together at the outlet of the detector to form the image of the light signal in the object plane of the sensor.

6. The equipment for analysing a particle beam according to claim 1, further comprising an ultra-high vacuum flange, and wherein the object image plane is formed behind the port of the ultra-high vacuum flange.

7. The equipment for analysing a particle beam according to claim 6, wherein the ultra-high vacuum flange is equipped with a port for passage of the light emitted by the optical fibres.

8. The equipment for analysing a particle beam according to claim 1, wherein said sensor is mounted directly in the object image plane.

9. The equipment for analysing a particle beam according to claim 1, comprising a CCD digital camera, and wherein the CCD sensor is built into the CCD digital camera.

10. The equipment for analysing a particle beam according to claim 1, wherein the optical fibres are aluminised over the entire length thereof.

11. The equipment for analysing a particle beam according to claim 1, wherein the optical fibres are manufactured in polystyrene.

12. The equipment for analysing a particle beam according to claim 1, wherein said sensor is a CCD sensor formed by CCD arrays with an associated digital electronics.

13. Equipment for analysing a particle beam comprising:
at least one detector comprising a network of optical fibres, the network of parallel fibres comprising at least one first plane of optical fibres oriented according to a first direction X;
the detector being arranged to produce a light signal when the particle beam passes through the network of optical fibres; and
an image sensor coupled with the detector such as to output a signal representing features of the light signal, the image sensor comprising at least one of a CCD and CMOS sensor;
wherein ends of the optical fibres of the network of fibres are arranged to form an object plane of the sensor; and
wherein the detector comprises two stages connected via an ultra-high vacuum flange.

14. The equipment for analysing a particle beam according to claim 13, wherein the first stage comprises two identical armatures wherein the optical fibres are urged to be positioned.

15. The equipment for analysing a particle beam according to claim 14, wherein each of the armatures of the first stage corresponds respectively to the horizontal and vertical coordinates of the particle beam by fixing at 90° the angle between the two planes of fibres.

16. The equipment for analysing a particle beam according to claim 13, wherein the first stage is located in a vacuum tube of the beam.

17. The equipment for analysing a particle beam according to claim 13, wherein the second stage comprises an optical system associated to a CCD digital camera.

18. The equipment for analysing a particle beam according to claim 13, wherein the second stage benefits from an electromagnetic shielding.

19. Equipment for analysing a particle beam comprising:
at least one detector comprising a network of optical fibres, the network of fibres further comprising a first plane of parallel optical fibres oriented according to a first direction and a second plane of parallel optical fibres oriented according to a second direction;
a light signal produced when the particle beam passes through the network of optical fibres;
an image sensor coupled with the detector, at least a portion of the optical fibres of each plane being arranged to form an image of the light signal in the sensor; and
armatures holding the optical fibres in a vacuum.

20. The equipment according to claim 19, wherein:
the sensor is a CCD digital camera including Peltier cooling, a low level of residual noise and at least 12.2 images per second;
the optical fibers are polystyrene scintillating fibers aluminised over their entire lengths and having a square cross-sectional shape; and
the particle beam position is accurately established within two tenths of a micron.

* * * * *

UNITED STATES PATENT AND TRADEMARK OFFICE
CERTIFICATE OF CORRECTION

PATENT NO. : 8,026,489 B2  
APPLICATION NO. : 12/223991  
DATED : September 27, 2011  
INVENTOR(S) : Maurice Haguenauer, Alain Busata and Akli Karar Page 1 of 1

It is certified that error appears in the above-identified patent and that said Letters Patent is hereby corrected as shown below:

Title Page (75) Inventors: "Alain Busata, Conlans-Sainte-Honorine (FR)" should be – "Alain Busata, Conflans-Sainte-Honorime (FR)"

Signed and Sealed this
Twentieth Day of December, 2011

David J. Kappos
*Director of the United States Patent and Trademark Office*